(12) United States Patent
Stroka

(10) Patent No.: US 11,288,874 B2
(45) Date of Patent: Mar. 29, 2022

(54) SYSTEM AND METHOD FOR THE ROBUST IMPLEMENTATION OF AR APPLICATIONS ON VEHICLES

(71) Applicant: Bayerische Motoren Werke Aktiengesellschaft, Munich (DE)

(72) Inventor: Andreas Stroka, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/012,921

(22) Filed: Sep. 4, 2020

(65) Prior Publication Data
US 2021/0074071 A1    Mar. 11, 2021

(30) Foreign Application Priority Data

Sep. 5, 2019 (DE) .................. 10 2019 123 807.2

(51) Int. Cl.
| | |
|---|---|
| *G06T 19/00* | (2011.01) |
| *G07C 5/08* | (2006.01) |
| *G06T 17/20* | (2006.01) |
| *G06T 15/04* | (2011.01) |
| *G06K 9/00* | (2022.01) |

(52) U.S. Cl.
CPC ........ *G06T 19/006* (2013.01); *G06K 9/00671* (2013.01); *G06T 15/04* (2013.01); *G06T 17/20* (2013.01); *G07C 5/0808* (2013.01)

(58) Field of Classification Search
None
See application file for complete search history.

(56) References Cited

U.S. PATENT DOCUMENTS

| | | |
|---|---|---|
| 2015/0062123 A1 | 3/2015 | Yuen |
| 2019/0370544 A1* | 12/2019 | Wright, Jr. ............ G06F 3/0488 |

OTHER PUBLICATIONS

Yeh et al., "3D Reconstruction and Visual SLAM of Indoor Scenes for Augmented Reality Application", IEEE, 2018. (Year: 2018).*
German language Office Action issued in German Application No. 10 2019 123 807.2 dated Aug. 17, 2020 (seven (7) pages).
Zhou, F.; Duh, H. B.-L.; Billinghurst, M.: Trends in augmented reality tracking, interaction and display: A review often years of ISMAR. In: 2008 7th IEEE/ACM International Symposium on Mixed and Augmented Reality. IEEE, 2008. S. 193-202 (10 pages).

* cited by examiner

*Primary Examiner* — Nicholas R Wilson
(74) *Attorney, Agent, or Firm* — Crowell & Moring LLP

(57) ABSTRACT

A system and method robustly displays augmented reality (AR) applications on a vehicle. The system has a mobile terminal that is configured to execute an AR application on the vehicle, wherein the AR application includes a display of AR contents on the vehicle using a three-dimensional grid. The mobile terminal has at least one sensor that is configured to capture physical sensor data relating to a position of the mobile terminal. The mobile terminal has a capture unit that is configured to capture a predefinable fixed point on the vehicle. The mobile terminal further includes a computing unit that is configured to evaluate the physical sensor data and the captured fixed point and to display the AR contents on the vehicle in a contact-analog manner.

8 Claims, 5 Drawing Sheets

SYSTEM AND METHOD FOR THE ROBUST IMPLEMENTATION OF AR APPLICATIONS ON VEHICLES

CROSS REFERENCE TO RELATED APPLICATION

This application claims priority under 35 U.S.C. § 119 from German Patent Application No. 10 2019 123 807.2, filed Sep. 5, 2019, the entire disclosure of which is herein expressly incorporated by reference.

BACKGROUND AND SUMMARY OF THE INVENTION

The present invention relates to a system and a method for the robust implementation of augmented reality (AR) applications on vehicles.

The use of AR applications in relation to vehicles is known. Thus, it is known practice to display AR contents relating to the environment of the vehicle on vehicle windows in the passenger compartment. Additionally, it is known practice to visualize vehicles in various configurational variants by means of AR applications, for example to assist potential customers in the configuration of a new vehicle. One issue with AR applications on vehicles is the correct initialization and display of same. For example, in the case of edge matching, good lighting conditions are prerequisite for correct initialization, such that the display may be hindered by poor environmental conditions (e.g. poor weather conditions).

The object of the invention is to provide a solution that allows a robust display of AR contents on vehicles in a contact-analog manner.

This object is achieved according to the invention by the features of the independent claims.

Preferred embodiments are the subject of the dependent claims.

The aforementioned object is achieved by a system for the robust display of augmented reality, AR, applications on a vehicle, comprising: a mobile terminal that is configured to execute an AR application on the vehicle, wherein the AR application comprises a display of AR contents on the vehicle using a three-dimensional grid; wherein the mobile terminal comprises:

at least one sensor that is configured to capture physical sensor data relating to a position of the mobile terminal;
a capture unit that is configured to capture a predefinable fixed point on the vehicle; and
a computing unit that is configured to evaluate the physical sensor data and the captured fixed point and to display the AR contents on the vehicle in a contact-analog manner.

The term vehicle, within the context of the document, covers mobile means of transport used for transporting people (passenger transport), goods (freight transport) or tools (machines or implements). In particular, the term vehicle covers motor vehicles and also motor vehicles that can be driven electrically at least some of the time (electric car, hybrid vehicles) as well as vehicles driving in automated fashion. The term "vehicle driving in automated fashion" or "automated driving" can be understood within the context of the document to mean driving with automated longitudinal or transverse guidance or autonomous driving with automated longitudinal and transverse guidance. Automated driving can be for example driving for a relatively long time on the freeway or driving for a limited time when parking or maneuvering. The term "automated driving" covers automated driving with an arbitrary level of automation. Exemplary levels of automation are assisted, semiautomated, highly automated or fully automated driving. These levels of automation have been defined by the German Federal Highway Research Institute (BASt) (see BASt publication "Forschung kompakt", issue November 2012). Assisted driving involves the driver continually performing the longitudinal or transverse guidance while the system undertakes the respective other function within certain boundaries. Semi-automated driving involves the system undertaking the longitudinal and transverse guidance for a certain period of time and/or in specific situations, with the driver needing to continually monitor the system as in the case of assisted driving. Highly automated driving involves the system undertaking the longitudinal and transverse guidance for a certain period of time without the driver needing to continually monitor the system; however, the driver must be capable of undertaking the vehicle guidance within a certain time. In the case of fully automated driving, the system can manage the driving automatically in all situations for a specific application; this application no longer requires a driver. The aforementioned four levels of automation correspond to SAE levels 1 to 4 of the SAE (Society of Automotive Engineering) J3016 standard. Further, there is also provision for SAE level 5 in SAE J3016 as the highest level of automation, which is not included in the definition from the BASt. SAE level 5 corresponds to driverless driving, wherein the system can manage all situations automatically for the entire journey in the same way as a human driver.

The vehicle can comprise a communication module for setting up a communication link with other communication subscribers, e.g. other vehicles, a server, a mobile terminal, etc. The communication link can be used for data transmission. The communication module can comprise a subscriber identity module or a SIM card (not shown) that is used to set up a communication link via a mobile radio system or the mobile radio network. The subscriber identity module explicitly identifies the communication module in the mobile radio network. The communication link can be a data link (e.g. packet switching) and/or a conductor-based communication link (e.g. circuit switching). Furthermore, a wireless communication link via other current and future technologies, e.g. local area networks (LANs) such as e.g. wireless LANs etc. can be set up with other communication subscribers via the communication module.

The term mobile terminal, within the context of the document, covers a device that is capable of communicating wirelessly in a mobile network via local area networks (LANs), such as for example wireless LAN (WiFi/WLAN), or via wide area networks (WANs) such as for example Global System for Mobile Communication (GSM), General Package Radio Service (GPRS), Enhanced Data Rates for Global Evolution (EDGE), Universal Mobile Telecommunications System (UMTS), High Speed Downlink/Uplink Packet Access (HSDPA, HSUPA), Long-Term Evolution (LTE) or World Wide Interoperability for Microwave Access (WIMAX). Communication using other current or future communication technologies, e.g. 5G mobile radio systems, is possible. The term mobile terminal in particular includes smartphones, but also AR smartglasses, other mobile telephones or cellphones, personal digital assistants (PDAs), tablet PCs, notebooks, smart watches and all current and future electronic devices that are equipped with technology for loading and executing applications (apps).

The term augmented reality (AR), within the context of the document, covers a computer-aided augmentation of the perception of reality. This comprises in particular the visual representation of information as a complement to images, videos, etc. using computer-generated supplementary information and/or virtual objects by means of superposition or overlay. The term AR application, within the context of the document, covers an application that can be loaded and executed by a mobile terminal and augments reality using AR or AR contents.

The system comprises a mobile terminal that is configured to load, and to execute, an AR application on the vehicle. This AR application comprises a display of AR contents on the vehicle using a three-dimensional grid.

A three-dimensional (3D) grid or 3D mesh is a 3D model of an object (in this case the vehicle) which defines the edges of the object.

The mobile terminal comprises at least one sensor that is configured to capture physical sensor data relating to a position of the mobile terminal.

The at least one sensor can comprise one or more of the following sensors:

gyroscope or gyroscopic sensor or position sensor that is configured to determine the position of the mobile terminal; and/or motion sensor that is configured to determine the acceleration of the mobile terminal along the X-axis, Y-axis and Z-axis as physical data. In this way, the position or changes in position of the mobile terminal can be determined.

The combination of the physical data from the motion sensor with the physical data from the gyroscope can allow the position of the mobile terminal to be determined.

The mobile terminal further comprises a capture unit that is configured to capture a predefinable fixed point on the vehicle.

The predefinable or predefined fixed point on the vehicle can for example comprise an emblem, a manufacturer's emblem or manufacturer's logo that is affixed to the vehicle.

The capture unit can for example comprise a camera. Using the camera, the predefinable fixed point on the vehicle can be captured.

The mobile terminal further comprises a computing unit that is configured to evaluate the physical sensor data captured by the at least one sensor and the captured fixed point on the vehicle and to display the AR contents on the vehicle in a contact-analog manner.

Advantageously, the capture of the predefinable or predefined fixed point on the vehicle allows the relative position of the vehicle with respect to the mobile terminal to be determined. Thus, when setting up the 3D grid for the initialization of the AR application, it is possible to avoid computationally intensive edge matching which is inaccurate or hindered due to the visual capture of the vehicle using the mobile terminal being negatively affected by environmental factors (e.g. lighting conditions, poor weather or poor weather conditions, poor contrast, etc.). In particular, the distance from the mobile terminal to the vehicle is decreased when capturing the predefinable or predefined fixed point on the vehicle (similar distance to when capturing a QR code using a mobile terminal), thereby obtaining higher accuracy. Furthermore, with this approach, only an initial detection is needed to set up the 3D grid, whereas with edge matching the setting up of the 3D grid takes place sequentially or continuously in the background. Consequently, the accuracy of the 3D grid generated using the described method is increased. Additionally, the mobile terminal can comprise a lighting unit (e.g. the flashlight function of a smartphone, known from the prior art). This can be used to illuminate the predefinable or predefined fixed point on the vehicle in the event of poor visibility or weather conditions. It cannot be used in the case of edge matching, which requires the capture of a large area of the vehicle for the generation of the 3D grid, since the lighting unit of the mobile terminal is not powerful enough for that purpose.

Simultaneously, by virtue of a continuous capture of the physical sensor data, the relative position of the mobile terminal with respect to the vehicle can be obtained, thereby making it possible to ensure a display of the AR contents on the vehicle in a contact-analog manner at any point in time and with any movement of the mobile terminal relative to the vehicle.

Preferably, the mobile terminal comprises an input and output unit that is configured to receive a user input; wherein the computing unit is configured to augment the AR contents with the user input.

The AR application can be configured to receive a user input from the user of the mobile terminal via an input and output unit. The computing unit of the mobile terminal is configured to augment the AR contents of the AR application with the user input.

Advantageously, a flexible augmentation of the AR application with user-related AR contents can thus be performed.

Preferably, the evaluation of the physical sensor data and of the predefinable fixed point for the display of the AR contents on the vehicle in a contact-analog manner comprises:

determining an exact relative position of the mobile terminal with respect to the predefinable fixed point;

determining an exact relative position of the vehicle with respect to the mobile terminal;

initializing the three-dimensional grid for the display of the AR contents on the vehicle; and displaying the AR contents in a contact-analog manner via simultaneous localization and mapping, SLAM.

The evaluation of the physical sensor data and the predefinable or predefined fixed point for the display of the AR contents on the vehicle in a contact-analog manner comprises determining the exact relative position of the mobile terminal with respect to the vehicle. This can be achieved by determining the coordinate data of the mobile terminal from the captured physical sensor data with respect to the predefinable fixed point on the vehicle.

Additionally, the evaluation comprises determining an exact relative position of the vehicle with respect to the mobile terminal. This can be achieved by obtaining the coordinate data of the mobile terminal with respect to the predefinable fixed point. The coordinate data of the vehicle can for example be stored locally on the mobile terminal. In another example, the coordinate data of the vehicle can be transmitted to the mobile terminal via the communication unit. In a further example, the coordinate data of the vehicle can be retrieved by the mobile terminal from a suitable server. Using these values, the relative position of the mobile terminal with respect to the vehicle can be determined by the computing unit of the mobile terminal.

Determining the exact relative positions of the mobile terminal and of the vehicle with respect to one another allows the initialization of the three-dimensional grid for the display of the AR contents of the AR application on the vehicle without requiring computationally intensive edge matching on the vehicle with the aforementioned known drawbacks with respect to the approach described in this document.

By using SLAM, the AR contents of the AR application can, by virtue of the physical sensor data, consequently be displayed in a contact-analog manner.

Preferably, the AR contents comprise:
damages present on the vehicle; and/or
operating instructions for the vehicle; and/or
accessories for the vehicle; and/or
repairs on the vehicle; and/or
informational contents on the vehicle.

According to a second aspect, the underlying object is achieved by a method for the robust display of augmented reality, AR, applications on a vehicle, comprising: executing, by means of a mobile terminal, an AR application on the vehicle, wherein the AR application comprises a display of AR contents on the vehicle using a three-dimensional grid; wherein executing the AR application on the vehicle comprises:
capturing, via at least one sensor, physical sensor data relating to a position of the mobile terminal;
capturing, via a capture unit, a predefinable fixed point on the vehicle; and
displaying, via a computing unit, the AR contents on the vehicle in a contact-analog manner after evaluation of the physical sensor data and the captured fixed point by the computing unit.

Preferably, the method further comprises: receiving, via an input and output unit on the mobile terminal, a user input; and augmenting the AR contents with the user input.

Preferably, the evaluation of the physical sensor data and of the predefinable fixed point for the display of the AR contents on the vehicle in a contact-analog manner comprises:
determining an exact relative position of the mobile terminal with respect to the predefinable fixed point;
determining an exact relative position of the vehicle with respect to the mobile terminal;
initializing the three-dimensional grid for the display of the AR contents on the vehicle; and
displaying the AR contents in a contact-analog manner via simultaneous localization and mapping, SLAM.

Preferably, the AR contents comprise:
damages present on the vehicle; and/or
operating instructions for the vehicle; and/or
accessories for the vehicle; and/or
repairs on the vehicle; and/or
informational contents on the vehicle.

These and other objects, features and advantages of the present invention will become clear from studying the detailed description of preferred embodiments that follows and the accompanying figures. It is obvious that—although embodiments are described separately—individual features therefrom can be combined to produce additional embodiments.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
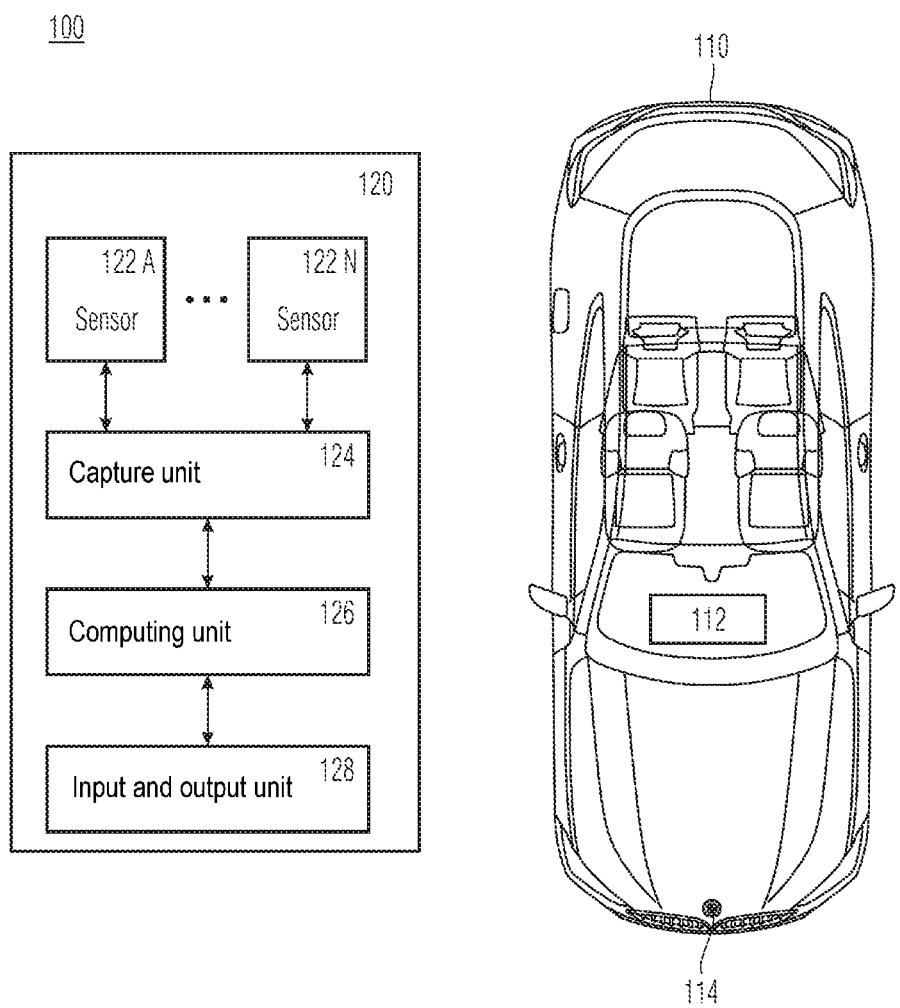
FIG. 1 shows a schematic system for the robust display of augmented reality, AR, applications on a vehicle.

FIG. 1 schematically shows an exemplary system 100 for the robust display of augmented reality, AR, applications on a vehicle 110.

The vehicle 110 can comprise a communication module 112 for setting up a communication link with other communication subscribers, e.g. other vehicles, a server, a mobile terminal 120, etc.

The system 100 comprises a mobile terminal 120 that is configured to execute an AR application on the vehicle 110. This AR application comprises a display of AR contents 510, 520 on the vehicle 110 using a three-dimensional grid 320. The three-dimensional (3D) grid or 3D mesh 320 is a 3D model of an object or of the vehicle 110, which defines the edges of the object or of the vehicle 110.

The AR contents 510, 520 can comprise damages present on the vehicle 110, as explained further below with reference to FIG. 5.

In addition or alternatively, the AR contents 510, 520 can comprise operating instructions or operating instructions information for the vehicle 110.

In addition or alternatively, the AR contents 510, 520 can comprise accessories for the vehicle 110. For example, various accessory items such as e.g. new rims, tinted windows, etc. can be shown.

In addition or alternatively, the AR contents 510, 520 can comprise repairs on the vehicle 110. For example, the places on the vehicle 110 where repair work should be carried out can be shown to, or highlighted for, the user of the vehicle 110.

In addition or alternatively, the AR contents 510, 520 can comprise further informational contents on the vehicle 110.

The mobile terminal 120 comprises at least one sensor 122 A . . . 122 N. The at least one sensor 122 A . . . 122 N is configured to capture physical sensor data relating to a position of the mobile terminal 120.

The at least one sensor 122 A . . . 122 N can comprise one or more of the following sensors 122 A . . . 122 N:
gyroscope or gyroscopic sensor or position sensor that is configured to determine the position of the mobile terminal 120 as physical sensor data; and/or
motion sensor that is configured to determine the acceleration of the mobile terminal 120 along the X-axis, Y-axis and Z-axis as physical sensor data. In this way, the position or changes in position of the mobile terminal 120 can be determined.

The combination or the evaluation of the physical sensor data from the motion sensor with the physical sensor data from the gyroscope allows the coordinate data 410 of the mobile terminal 120 to be continuously and precisely determined.

The mobile terminal 120 further comprises a capture unit 124 that is configured to capture a predefinable fixed point 114, 310 on the vehicle 110. The predefinable or predefined fixed point 114, 310 on the vehicle 110 can for example comprise an emblem, a manufacturer's emblem or manufacturer's logo that is affixed to the vehicle 110. In particular, the predefinable or predefined fixed point 114, 310 on the vehicle 110 can comprise the BMW emblem or BMW logo 310 (see FIG. 3A) which is affixed to a BMW vehicle 110 (see FIG. 3A).

The capture unit 124 can for example comprise a camera. Using the camera, the predefinable fixed point 114, 310 on the vehicle 110 can be captured or recorded.

The mobile terminal 120 further comprises a computing unit 126 that is configured to evaluate the physical sensor data captured by the at least one sensor 122 A ... 122 N and the captured fixed point 114, 310 on the vehicle 110 and to display the AR contents 510, 520 on the vehicle 110 in a contact-analog manner.

The evaluation of the physical sensor data and of the predefinable or predefined fixed point 114, 340 for the display of the AR contents 510, 520 on the vehicle 110 in a contact-analog manner can comprise determining the exact relative position 430 of the mobile terminal 120 with respect to the vehicle 110. This can be achieved by determining the coordinate data 410 of the mobile terminal 120 from the captured physical sensor data with respect to the predefinable fixed point 114, 310 on the vehicle 110, as described further below with reference to FIG. 4.

Additionally, the evaluation can comprise determining an exact relative position of the vehicle 110 with respect to the mobile terminal 120. This can be achieved by obtaining the coordinate data 420 of the vehicle 110 with respect to the predefinable fixed point 110, 310. The coordinate data 420 of the vehicle 110 can for example be stored locally on the mobile terminal 120. In another example, the coordinate data 420 of the vehicle 110 can be transmitted to the mobile terminal 120 via the communication unit 112. In a further example, the coordinate data of the vehicle 110 can be retrieved by the mobile terminal 120 from a suitable server (not shown).

Determining the exact relative positions of the mobile terminal 120 and of the vehicle 110 with respect to one another allows the initialization of the three-dimensional grid 320 for the display of the AR contents 510, 520 of the AR application on the vehicle 110 without it requiring computationally intensive and error-prone edge matching on the vehicle 110.

By using SLAM, the AR contents 510, 520 of the AR application can, by virtue of the physical sensor data, consequently be displayed in a contact-analog manner.

Advantageously, the capture of the predefinable or predefined fixed point 114, 310 on the vehicle 110 allows the relative position of the vehicle 110 with respect to the mobile terminal 120 to be determined. Thus, when setting up the 3D grid 320 for the initialization of the AR application, it is possible to avoid computationally intensive edge matching which is inaccurate or hindered due to the visual capture of the vehicle 110 using the mobile terminal 120 being negatively affected by environmental factors (e.g. lighting conditions, poor weather or poor weather conditions, poor contrast, etc.). In particular, the distance from the mobile terminal 120 to the vehicle 110 is decreased when capturing the predefinable or predefined fixed point on the vehicle 114, 310 (similar distance to when capturing a QR code using a mobile terminal 120), thereby obtaining higher accuracy. Furthermore, with this approach, only an initial detection is needed to set up the 3D grid 320, whereas with edge matching the setting up of the 3D grid (not shown) takes place sequentially or continuously in the background. Consequently, the accuracy of the 3D grid 320 generated using the described method is increased. Additionally, the mobile terminal 120 can comprise a lighting unit (not shown, e.g. the flashlight function of a smartphone, known from the prior art). This lighting unit can be used to illuminate the predefinable or predefined fixed point 114, 310 on the vehicle 110 in the event of poor visibility or weather conditions. It cannot be used in the case of edge matching, which requires the capture of a large area of the vehicle 110 for the generation of the 3D grid, since the lighting unit of the mobile terminal 120 is not powerful enough for that purpose.

Simultaneously, by virtue of a continuous capture of the physical sensor data, the relative position 430 of the mobile terminal 120 with respect to the vehicle 110 can be obtained, as explained in greater detail further below with reference to FIG. 4. This makes it possible to ensure a display of the AR contents 510, 520 on the vehicle 110 in a contact-analog manner at any point in time and with any movement of the mobile terminal 120 relative to the vehicle 110.

The mobile terminal 120 can comprise an input and output unit 128 that is configured to receive a user input from the user 130 of the mobile terminal 120. The computing unit 126 of the mobile terminal 120 can be configured to augment the AR contents 510, 520 of the AR application with the user input 530, as explained more precisely further below with reference to FIG. 5.

Advantageously, a flexible augmentation of the AR application with user-related AR contents 530 can thus be performed.

Figure 2:
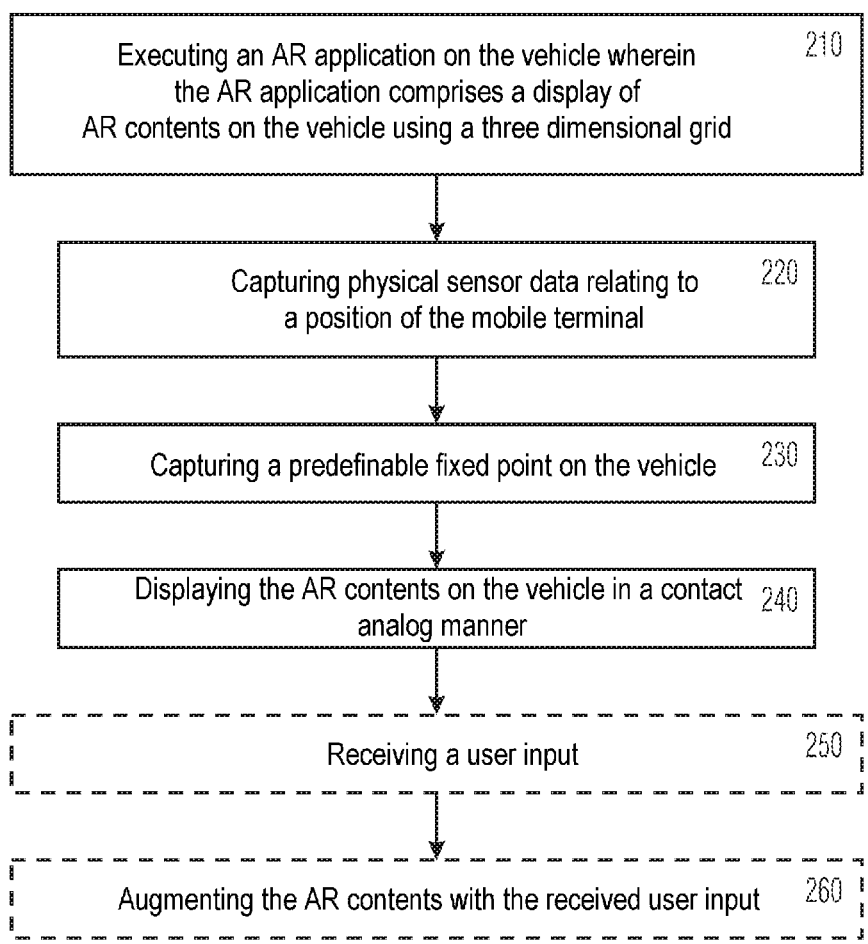
FIG. 2 shows an exemplary method for the robust display of AR applications on a vehicle.

FIG. 2 shows a method 200 for the robust display of augmented reality, AR, applications on a vehicle 110, which can be executed via a system 100 as described with reference to FIG. 1.

The method 200 comprises:
executing 210, by means of a mobile terminal 120, an AR application on the vehicle 110, wherein the AR application comprises a display of AR contents 510, 520 on the vehicle 110 using a three-dimensional grid 320;
wherein executing 210 the AR application on the vehicle 110 comprises:
capturing 220, via at least one sensor 122 A ... 122 N, physical sensor data relating to a position of the mobile terminal 120;
capturing 230, via a capture unit 124, a predefinable fixed point 114, 320 on the vehicle 110; and
displaying 240, via a computing unit 126, the AR contents 510, 520 on the vehicle 110 in a contact-analog manner after evaluation 245 of the physical sensor data and of the captured fixed point 114, 310 by the computing unit 126.

The method can comprise:
receiving 250, via an input and output unit 128 on the mobile terminal 120, a user input; and
augmenting 260, via the computing unit 126, the AR contents 510, 520 with the received user input 530.

The evaluation 245 of the physical sensor data and of the predefinable fixed point 114, 320 for the display of the AR contents 510, 520 on the vehicle 110 in a contact-analog manner can comprise:
determining an exact relative position of the mobile terminal 120 with respect to the predefinable fixed point 114, 320;
determining an exact relative position of the vehicle 110 with respect to the mobile terminal 120;
initializing the three-dimensional grid 320 for the display of the AR contents 510, 520 on the vehicle 110 in a contact-analog manner; and
displaying the AR contents 510, 520 in a contact-analog manner via simultaneous localization and mapping, SLAM.

The AR contents 510, 520 can comprise:
damages present on the vehicle 110; and/or
operating instructions for the vehicle 110; and/or
accessories for the vehicle 110; and/or
repairs on the vehicle 110; and/or
informational contents on the vehicle 110.

Figure 3A:
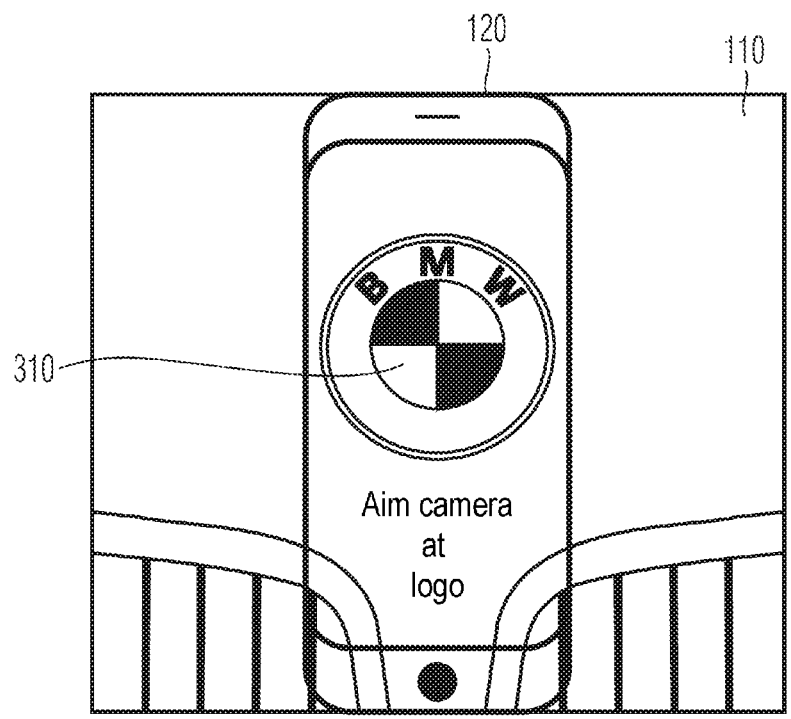
FIG. 3A shows, by way of example, a mobile terminal on which an AR application is initialized on a predefined fixed point on the vehicle.

FIG. 3A shows, by way of example, a mobile terminal 120 on which an AR application is initialized on a predefined fixed point 310 on the vehicle 110 as described with reference to FIG. 1.

Figure 3B:
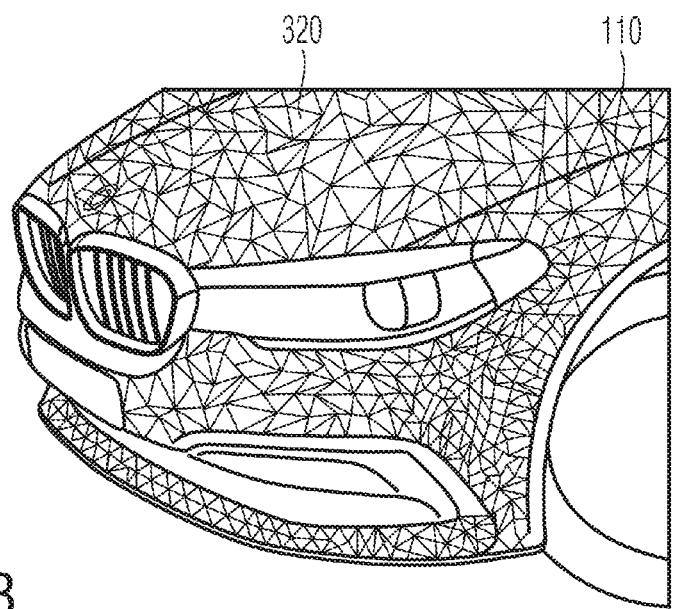
FIG. 3B shows an exemplary three-dimensional grid with the aid of which AR contents are displayed on the vehicle.

FIG. 3B shows an exemplary three-dimensional grid 320 with the aid of which later on—as described with reference to FIG. 1—AR contents 510, 520 are displayed on the vehicle 110.

Figure 4:
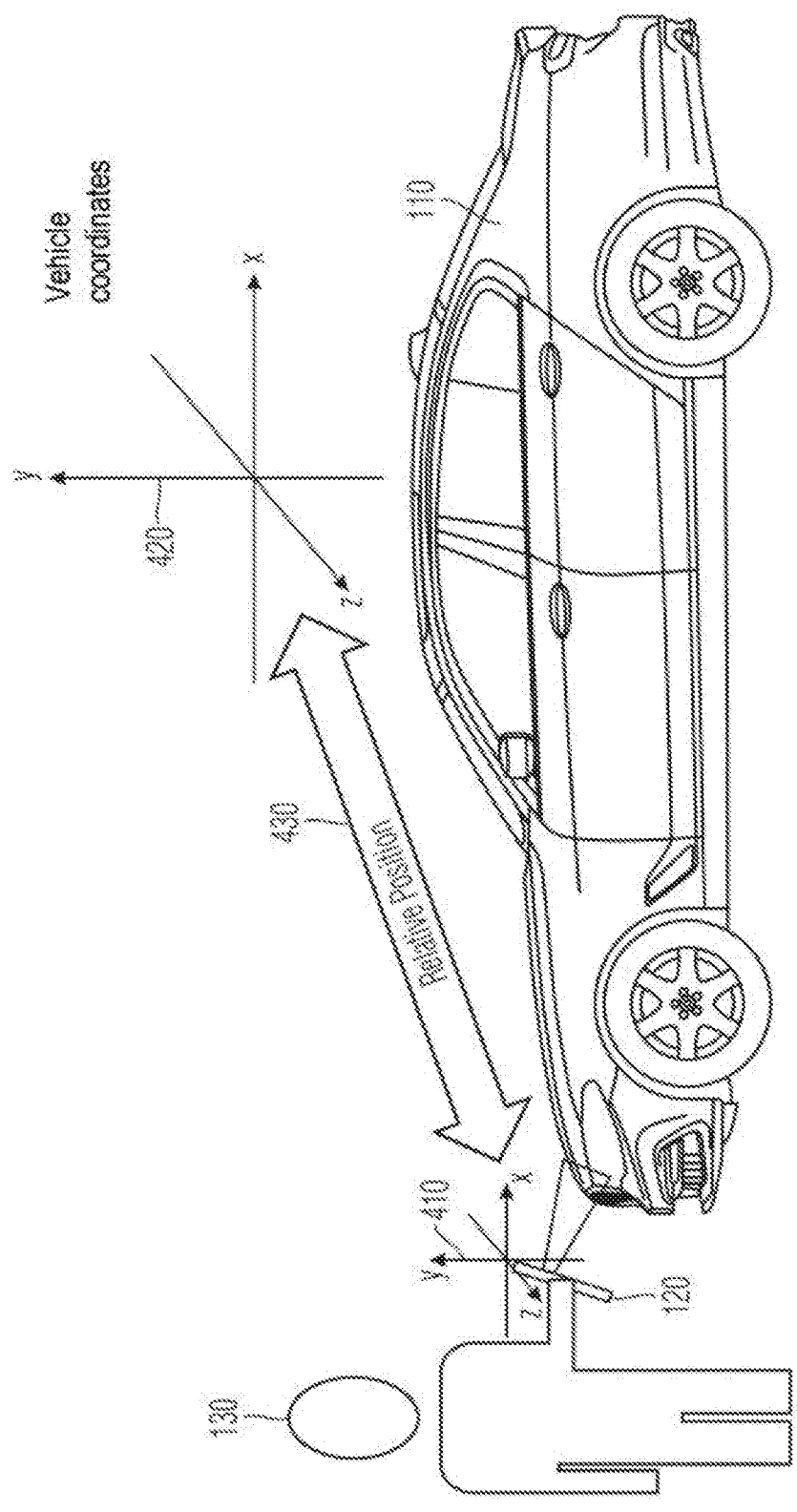
FIG. 4 schematically shows an initialization of the AR application on the vehicle.

FIG. 4 schematically shows an initialization of the AR application on the vehicle 110. For this, the computing unit 140 of the mobile terminal 120 determines—as described with reference to FIG. 1—relative coordinate data 410 of the mobile terminal 120 from the physical sensor data and the predefinable fixed point 114, 310 of the vehicle 110. Additionally, the computing unit 140 of the mobile terminal 120 determines the coordinates 420 of the vehicle 110, as described with reference to FIG. 1. The computing unit 140 of the mobile terminal determines therefrom the relative position 430 of the mobile terminal 120 with respect to the vehicle 110, making it possible to initialize the AR application without implementing intensive edge matching.

Figure 5:
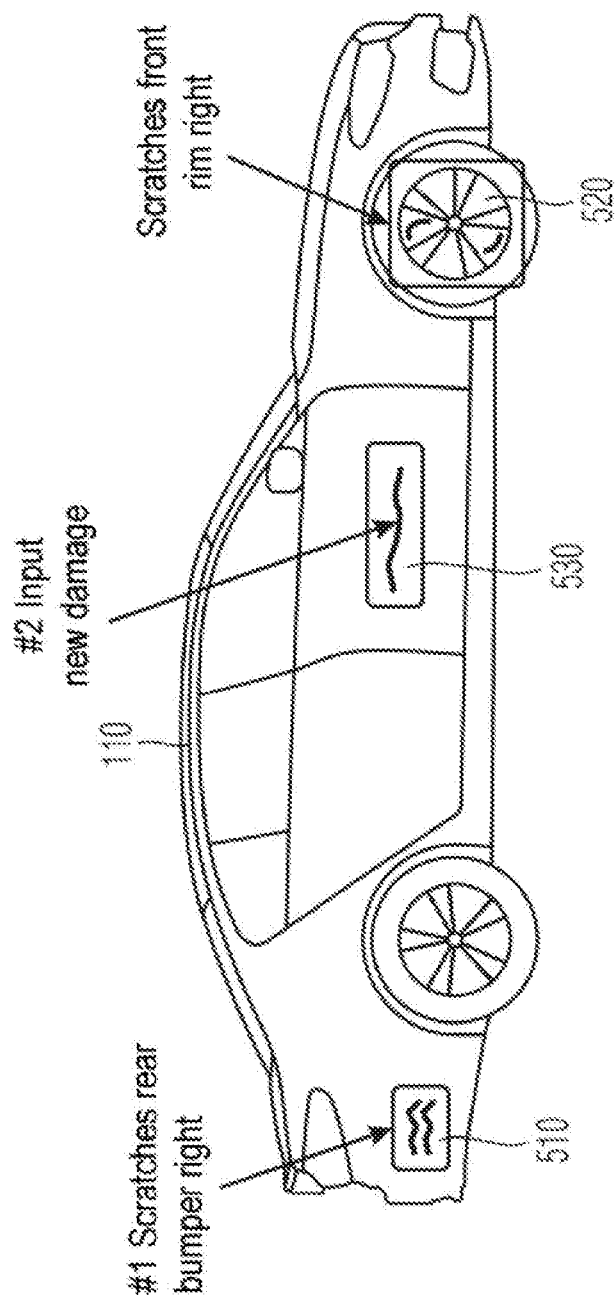
FIG. 5 shows an exemplary display of AR contents on the vehicle.

FIG. 5 shows an exemplary display of AR contents 510, 520 on the vehicle 110. The AR contents 510, 520 show damages present on a vehicle 110, which are shown to the user 130 of the mobile terminal 120 before the reservation of a car-sharing vehicle 110. The AR contents 510, 520 can be augmented by the user 130 of the mobile terminal 120 with a user-defined AR content 530 via an appropriate input via the input and output unit 128 of the mobile terminal 120. In particular, the user 130 can input a further damage on the vehicle 110 via the mobile terminal 120 before reserving the vehicle 110. The AR application is augmented with the user-defined AR content 530.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system for robust display of augmented reality (AR) applications on a vehicle, comprising:
  a mobile terminal that is configured to execute an AR application on the vehicle, wherein the AR application comprises a display of AR contents on the vehicle using a three-dimensional grid;
  wherein the mobile terminal comprises:
    at least one sensor that is configured to capture physical sensor data relating to a position of the mobile terminal;
    a capture unit that is configured to capture exactly one predefinable fixed point on the vehicle, wherein the predefinable fixed point corresponds to a feature on the vehicle; and
    a computing unit that is configured to evaluate the physical sensor data and the captured fixed point and to display the AR contents on the vehicle in a contact-analog manner, and
  wherein the evaluation of the physical sensor data and of the captured fixed point comprises using the captured fixed point to initialize the three-dimensional grid.

2. The system according to claim 1, wherein
  the mobile terminal comprises an input and output unit that is configured to receive a user input; and
  the computing unit is configured to augment the AR contents with the user input.

3. The system according to claim 1, wherein the evaluation of the physical sensor data and of the captured fixed point further comprises:
  determining an exact relative position of the mobile terminal with respect to the captured fixed point;
  determining an exact relative position of the vehicle with respect to the mobile terminal;
  initializing the three-dimensional grid for the display of the AR contents on the vehicle in a contact-analog manner; and
  displaying the AR contents in a contact-analog manner via simultaneous localization and mapping (SLAM).

4. The system according to claim 1, wherein the AR contents comprise at least one of:
  damage present on the vehicle;
  an operating instruction for the vehicle;
  an accessory for the vehicle;
  a repair on the vehicle; or
  informational content on the vehicle.

5. A method for robust display of augmented reality (AR) applications on a vehicle, comprising:
  executing, via a mobile terminal, an AR application on the vehicle, wherein the AR application comprises a display of AR contents on the vehicle using a three-dimensional grid;
  wherein the executing of the AR application on the vehicle comprises:
    capturing, via at least one sensor, physical sensor data relating to a position of the mobile terminal;
    capturing, via a capture unit, exactly one predefinable fixed point on the vehicle, wherein the predefinable fixed point corresponds to a feature on the vehicle; and
    displaying, via a computing unit, the AR contents on the vehicle in a contact-analog manner after evaluation of the physical sensor data and of the captured fixed point by the computing unit, and
  wherein the evaluation of the physical sensor data and of the captured fixed point comprises using the captured fixed point to initialize the three-dimensional grid.

6. The method according to claim 5, further comprising:
  receiving, via an input and output unit on the mobile terminal, a user input; and
  augmenting, via the computing unit, the AR contents with the received user input.

7. The method according to claim 5, wherein the evaluation of the physical sensor data and of the captured fixed point further comprises:
  determining an exact relative position of the mobile terminal with respect to the captured fixed point;
  determining an exact relative position of the vehicle with respect to the mobile terminal;
  initializing the three-dimensional grid for the display of the AR contents on the vehicle in a contact-analog manner; and
  displaying the AR contents in a contact-analog manner via simultaneous localization and mapping (SLAM).

8. The method according to claim 5, wherein the AR contents comprise at least one of:

damage present on the vehicle;
an operating instruction for the vehicle;
an accessory for the vehicle;
a repair on the vehicle; or
informational content on the vehicle.

\* \* \* \* \*